United States Patent [19]

Yau et al.

[11] Patent Number: 5,393,863

[45] Date of Patent: Feb. 28, 1995

[54] PRODUCTION OF BRANCHED POLYESTERS

[75] Inventors: Cheuk C. Yau; Clinton Cherry, both of Kingsport, Tenn.

[73] Assignee: Eastman Chemical Company, Kingsport, Tenn.

[21] Appl. No.: 315

[22] Filed: Jan. 4, 1993

[51] Int. Cl.$^6$ ............................................. C08G 63/16
[52] U.S. Cl. ................... 528/308.4; 528/272; 528/308.2; 528/308.4; 528/308.5; 528/308.6; 528/483; 528/495; 528/498; 528/503
[58] Field of Search ............... 528/272, 308.6, 483, 528/495, 498, 503, 308.2, 308.4, 308.5

[56] References Cited

U.S. PATENT DOCUMENTS

| | | | |
|---|---|---|---|
| 3,953,404 | 4/1976 | Borman | 525/437 |
| 4,064,112 | 12/1977 | Rothe et al. | 528/272 |
| 4,591,629 | 5/1986 | El-Ghatta et al. | 528/308.2 |
| 5,049,647 | 6/1991 | Al-Ghatta | 528/272 |
| 5,145,742 | 9/1992 | Yau | 428/402 |
| 5,149,485 | 9/1992 | Belcher | 264/532 |

FOREIGN PATENT DOCUMENTS

| | | |
|---|---|---|
| A2503000 | 8/1975 | Germany. |
| 55-013715 | 1/1980 | Japan. |
| 59-219328 | 12/1984 | Japan. |

OTHER PUBLICATIONS

Swiss Patent Application No. 655938, May 30, 1986 (abstract).
European Patent Application No. 0 389 948, Mar. 10, 1990.

*Primary Examiner*—Samuel A. Acquah
*Attorney, Agent, or Firm*—Betty J. Boshears; Harry J. Gwinnell

[57] ABSTRACT

Disclosed is an improvement in a process for producing branched polyesters wherein a precursor polyester is first formed and subsequently the precursor polyester is formed into particles and further polymerized in the solid state, wherein the improvement comprises contacting the particles while at a temperature of about 140° to about 2° C. below the melting point of the polyester with the vapor of water or an organic compound having at least one OH group.

14 Claims, No Drawings

PRODUCTION OF BRANCHED POLYESTERS

TECHNICAL FIELD

The present invention relates to branched polyesters having improved resistance to the formation of gels when formed into articles, thereby resulting in articles having good clarity. As used herein, the term "polyesters" is intended to mean copolyesters as well as homopolyesters. The invention is particularly applicable to polyethylene terephthalate (PET) branched with a polyfunctional acid, anhydride or alcohol.

BACKGROUND OF THE INVENTION

It is well known in the art that adding branching agents to polyesters will increase their melt strength. However, to date, there are very few successful commercial branched polyesters. One drawback of branched polyesters is the tendency to form gels in the application of extrusion into films. These gels are localized, higher molecular weight areas giving rise to an uneven, poor clarity appearance to the film. One common solution is to equip extruders with screws having high shear or high mixing capabilities. This forces the users to install new screws for their existing machines and thus incur extra expense to the end users. The problem with gels can be alleviated by introducing a controlled amount of moisture (as vapors of water, alcohols or glycols and in general, any organic compound with one or more hydroxyl groups) into the effluent gas (e.g. nitrogen, helium, argon and the like or mixtures there of including air) during solid-state polymerization of the polyesters, and films with high clarity can be obtained with regular extrusion screws.

High molecular weight polyesters are generally prepared by a melt-phase polycondensation process followed by a solid-state polymerization process. When the polyester is branched, the chain branching often results in an increase in the tendency for chain entanglement. Areas of high entanglement may be viewed as localized networks which are the centers of gels observed on a macro scale upon molding into articles.

During melt phase polymerization, polymer chains have enough mobility so that localized networks due to entanglement are reduced. On the contrary, during solid-state polymerization, parts of the polymer chains are already engaged in crystalline regions. Therefore, the chains have limited mobility. As the polymerization and cross linking progresses, 'knots' and 'kinks' are formed. The degree of entanglement is therefore increased leading to the formation of localized polymer networks. These entanglements manifest themselves as gels which are often observed upon molding into articles. The greater the difference between solid-state polymerized and melt-phase polymerized molecular weight, the greater the tendency to form gels.

Parts of the polymer chains in the localized polymer networks formed during solid-state polymerization are under excessive strain because of the lack of mobility of the chains. The points along the polymer chain with the highest strains are most vulnerable to chemical attack. If certain molecules are present in the effluent gas during solid-state polymerization, the bonds under the greatest strain will be broken the fastest, thus producing a 'relaxing' effect for the networks and entanglement is reduced. As a result, the number of gels is reduced.

Applicants are not aware of any prior disclosures of adding vapor of compounds having reactive OH groups to the effluent gas to produce branched polyesters of high molecular weights that will reduce gels and result in high clarity articles. In fact, most of the literature advises that moisture should be kept to a minimum to prevent loss of solid-state polymerization rate. There are a few patents that mention use of water/alcohols with solid-state polymerization, but they are irrelevant to the present invention, as explained below. Treatment of poly(ethylene terephthalate) polymers with supercritical carbon dioxide and water under high pressure to reduce acetaldehyde is known. However, both carbon dioxide and high pressure are required and it was not under solid-state polymerization conditions. Swiss Patent Application No. 655,938 discloses a process of two stages: (1) treating the polyester with alcohol or alcohol/water until the aldehyde content is below 35 ppm, then (2) postcondensing at 200°-245° C. It requires the measurement for acetaldehyde at the first stage and is therefore irrelevant to our present invention which applies to polymers without the need of intermediate measurement of acetaldehyde. Japanese Patent No. 59219328 discloses a process to perform moisture conditioning with a moisture content of at least 0.2 wt % to reduce acetaldehyde. The level of water disclosed is much higher than that which our present invention requires and is therefore irrelevant. Japanese Patent No. 55013715 discloses extraction of polyesters before or after solid-state polymerization by dipping the polyesters in solvents. European Patent Application No. 389,948 discloses bringing PET having an intrinsic viscosity of at least 0.50 dl/g and a density of 1.38 or more into contact with water to reduce the amounts of oligomers and acetaldehyde formed at the time of molding.

The present invention involves contacting the precursor polyester particles with the vapor of water or an organic compound having one or more hydroxyl groups, preferably into the effluent gas during or after solid-state polymerization of polyesters including during crystallization.

DESCRIPTION OF THE INVENTION

According to the present invention, there is provided a process for producing branched polyesters having improved resistance to gel formation comprising a) producing a precursor polyester, b) forming the precursor polyester into particles, c) further polymerizing said particles in the solid state, and d) contacting said particles while at a temperature of about 140° to about 2° C. below the melting point of the polyester for a time of about 0.1 to about 100 hours with the vapor of water or an organic compound having at least one OH group.

According to a preferred embodiment of the present invention, in a process for producing branched polyesters wherein a precursor polyester is first formed and subsequently the precursor polyester is formed into particles and further polymerized in the solid state, there is provided the improvement which comprises contacting the particles while at a temperature of about 140° to about 2° C. below the melting point of the polyester for a time of about 1 to about 100 hours with inert gas having a flow rate of greater than $2 \times 10^{-2}$ m/s (meters per second), the inert gas containing about 300 to about 7000 parts per million by volume of the vapor of water or an organic compound having at least one OH group.

Further, according to the present invention, there is provided a process for producing polyester articles having improved clarity and reduced gel content which comprises a) producing a polyester having an I.V. of about 0.3 to about 1.0 by the melt phase polymerization of at least one dicarboxylic acid or corresponding ester such as the dimethyl ester having 3 to 22 carbon atoms, at least one glycol having 2 to 18 carbon atoms, and at least one polyfunctional branching agent, b) forming particles of the polyester to a size expressed in weight, of about 0.002 g/particle to about 0.2 g/particle, c) contacting the particles while at a temperature of about 140° to about 2° C. below the melting point of the polyester for a time of about 0.1 to about 100 hours with the vapor of water or an organic compound having at least one OH group, d) heating the particles to form a melt and e) molding the melt into an article.

It is preferred that the vapor described herein be mixed with or injected into the inert gas which is conventionally used in solid stating processes. However, the polyester particles may be contacted by the vapor alone. If the vapor is pure or used in high concentrations, the contact time may be short within the range stated above. However, if the vapor is used in low concentrations, the contact time is long within the range stated above. Thus, the contact time required is inversely proportional to the concentration or purity of the vapor. Because of the obvious advantages of mixing the vapor with the inert gas used in conventional solid stating processes, this specification will refer, in the most part, to such processes wherein the vapor is mixed with the inert gas. Thus, a separate processing step is not required.

The point of introduction of the vapor can be anywhere along the process of a continuous solid-state polymerization. That is, the point of introduction can be at the bottom of the reactor, close to the top of the reactor or any point in between in a continuous process. It can even be at the end of the solid-state polymerization by treating the pellets with vapor in a reactor at the end of the solid-state polymerization process. It can also be anywhere along the reaction profile in a batch process. That is, vapor can be added at the beginning, towards the end or anywhere in between in a batch process.

The vapor can be added as a continuous stream or in pulses. The vapor can also be introduced into the process at more than one location, simultaneously, continuously, or in pulses. In the latter case, pulses at different locations can be synchronized or staggered.

Normally, in the continuous solid stating of polyesters, the precursor is crystallized under forced motion at a temperature of 100° C. to 260° C. under an atmosphere of inert gas, air, or mixture of inert gas and air, passed to a continuous fixed bed reactor, and continuously polycondensed in the reactor while in contact with an inert gas stream.

The precursor polyester usually has an I.V. of about 0.3 to about 1.0, most often about 0.5 to about 0.8 dl/g. The precursor polyester is typically made by conventional, well known techniques of esterification or transesterfication of one or more dicarboxylic acids or dialkyl esters thereof (e.g., dimethyl terephthalate) with one or more glycols and a small amount of a branching agent, followed by condensation to a low molecular weight, or precursor polyester.

While the present description is concerned to a large extent with the preparation of polyethylene terephthalate by reason of the commercial importance of this material, the method is also suitable for the treatment of similar homopolymers and copolymers. These may be exemplified by the crystallizable homo- and copolymeric esters of terephthalic, isophthalic, chloroterephthalic, nitroterephthalic or hydrogenated terephthalic acids with one or more glycols, such as ethylene glycol, propylene glycol, 2,2-dimethylpropanediol-1,3, 1,4-butane glycol and 1,4-cyclohexanedimethanol, as well as copolymers of the type which may be derived from one or more of those glycols and a plurality of acids comprising (1) substituted and unsubstituted terephthalic acids as just described and also (2) one or more of such acids as adipic, sebacic or 2,6-naphthalene dicarboxylic acids. For instance, suitable copolyesters may be prepared from terephthalic acid and a mixture of ethylene glycol and 1,4-cyclohexanedimethanol or from ethylene glycol, diethylene glycol and a mixture of a major proportion of terephthalic acid and a minor proportion of isophthalic acid. The polyesters prepared in accordance with the present invention are not limited to those prepared from such glycols and acids per se, for other preparatory methods are usually suitable as exemplified by the esterification of terephthalic acid with alkylene oxides, such as ethylene oxide, or the transesterification of dimethyl terephthalate with ethylene glycol.

The dicarboxylic acid(s), glycol(s) and branching agent are reacted in well known manners to form the polyester precursor. Any of the well known, conventional catalysts such as, but not limited to, Mn, Ti, Zn, Ge, Sb, Co and P, may be used to form the polyester in accordance with the present invention. For example, see U.S. Pat. Nos. 4,010,145 and 3,962,189. The precursor particles are produced by forming solid particles such as pellets from the precursor polymer in well known manner.

Conventional branching agents such as polyfunctional acids, anhydrides or alcohols (usually tri- or tetrafunctional) are used in the reaction mix of monomers. Typical amounts range from about 0.001 to about 0.5 mol %. Examples include trimellitic acid, trimellitic anhydride, pentaerythritol, and pyromellitic dianhydride.

The polyester precursor particles are normally crystallized under forced motion at a temperature of about 100°–260° C. prior to being solid-state polymerized.

Normally, in solid stating particles in accordance with the present invention, particles of regular or irregular shape may be used. The particles may be of various shapes and sizes such as spherical, cubical, irregular such as described in U.S. Pat. No. 5,145,742 (incorporated herein by reference), cylindrical, or as described in U.S. Pat. No. 4,064,112. "Particles" also include shapes which are generally flat.

Solid state polymerization is a process well known in the art. See, for example, U.S. Pat. No. 4,064,112, which is incorporated herein by reference. Generally, when molding grade pellets are produced, either a batch or continuous process is used. Continuous processes are preferred for commercial operations for obvious reasons.

Solid stating is normally accomplished by subjecting the polyester particles to a temperature of about 140° to about 2° C., preferably about 180°–10° C., below the melting point of the polyester. The time of solid stating can vary over a wide range (about 1 to 100 hours) according to temperature to obtain the desired I.V., but with the higher temperatures, usually about 5 to about 40 hours is sufficient to obtain the desired I.V. or molecular weight. During this period of solid stating, it is conventional to flow a stream of inert gas through the particles to aid in temperature control of the polyester pellets and to carry away reaction gases such as ethylene glycol and acetaldehyde. Nitrogen is especially suitable for use as the inert gas because it contributes to the overall economy of the process. Preferably, the inert gas is recycled for economic reasons.

Other inert gases which may be used include helium, argon, hydrogen, and mixtures thereof. Some solid-state polymerization processes use air as an inert gas, or mixtures thereof, with inert gases particularly during crystallization.

By "flowing the inert gas through the particles", or similar expressions herein, it is meant moving an atmosphere containing the inert gas, which in turn contains the water or organic compound described herein, around the particles for a time of about 1 to about 100 hours, preferably about 5–20 hours, at a temperature at which the water or organic compound is in a vaporous state. Preferably, this is accomplished by injecting the water or organic compound into the inert gas used in solid stating.

According to the present invention, vapor of water or an organic compound having reactive OH groups is injected into the inert gas. While this may be done during solid stating or subsequent to solid stating, it is preferred that vapor be injected into the inert gas used during solid stating. The vapor used may be mixed with the inert gas as vapor, or as a liquid which will quickly vaporize when it is contacted by the inert gas. The inert gas and polyester particles should be at a temperature sufficiently high to maintain the vapor in the vapor state throughout the solid stating process.

The amount of vapor used is between 300 and 7,000 parts per million (ppm) parts inert gas by volume in conventional solid stating processes. Preferably about 500 to about 2,000 ppm are used. When a separate step is used, either non-diluted vapor or vapor diluted with inert gas to at least 300 ppm vapor content is used. As mentioned previously, the inert gas may contain some air.

Water is the preferred compound. Other organic compounds which may be used include methanol, ethanol, propanol and ethylene glycol. As a practical matter, the organic compounds will contain no more than 4 hydroxyl groups.

The vapor is thoroughly mixed with the inert gas prior to flowing through the pellets. This may be accomplished by conventional injectors located in the inert gas conduit just prior to entering the solid stating vessel. Typical mixing apparatus or processes useful in this invention are well known in the art. For example, the mixing may be accomplished simply by feeding the vapor through a conduit into the inert gas stream.

Preferably a flow rate of greater than $2 \times 10^{-2}$ m/s, preferably greater than about $8 \times 10^{-2}$ m/s is used for the inert gas.

The pellets used in accordance with the present invention may be molded using conventional procedures. Melting the pellets and forming a molded article may be accomplished by apparatus and procedures known in the art, such as, for example, in an extrusion blow molding machine, stretch blow molding machine, injection molding machine, or film casting apparatus (see, for example, U.S. Pat. No. 5,149,485 incorporated herein by reference).

As used herein, SCFH means standard cubic feet per hour and SCFM means standard cubic feet per minute.

The following examples are submitted for a better understanding of the invention.

Example 1—A stream of nitrogen having a flow rate of 14.0 scfh (standard cubic feet per hour) was mixed with another stream of moisture-laden nitrogen (flow rate at 0.67 scfh) and was applied to the solid-state polymerization reactor through a mix tank. This nitrogen stream had a dew point of $-19° \pm 0.5°$ C. The nitrogen was heated to 215° C. with a heat exchanger. The reactor was heated to 215° C. Poly(ethylene co-1,4-dimethylenecyclohexane 96.1:3.9 terephthalate) with 0.259 weight percent of trimellitic acid as branching agent (850 g, inherent viscosity 0.626 dl/g, irregular shaped pellets, 0.018 g/pellet at 180° C. for 60 minutes) was added to the solid state reactor. The sample was thus solid-state polymerized for 4.203 hours. The resulting product had an inherent viscosity of 0.850 dl/g. The product was extruded on a Killion extruder with a 1-inch screw to yield a gel-free film of high clarity.

Example 2—Polyester precursor pellets having an I.V. of 0.626 are continuously fed into the top of a continuous reactor and removed from the bottom in a manner such that the pellets form a slowly moving bed in which the pellets have a residence time of 16 hours. The size of the reactor is 12 feet in height and 2 feet in diameter. Temperature of the pellets entering the top is 210° C. and temperature of the pellets being removed is 220° C.. Nitrogen is caused to enter the reactor near the bottom through a circumferential supply ring, and is removed from the top through a conduit. The nitrogen is recycled in conventional manner. The nitrogen temperature entering the reactor is 220° C. and the nitrogen temperature leaving the reactor is 214° C. The flow rate is 23 scfm. Water vapor at a temperature of 160° C. is injected into the nitrogen stream prior to entering the supply ring in an amount such that the concentration of water vapor is 1300 ppm by weight based on the weight of nitrogen. Pellets being removed from the reactor have an I.V. of 0.98 dl/g. These pellets are subsequently extruded, into a 10 mil film, using a conventional extruder and found to be substantially gel-free by visual inspection.

Example 3—Example 2 is repeated. Reactor size, nitrogen flow rate, residence time, and water vapor concentration are varied as shown in the following table. I.V. of the solid stated polymer is about 0.98 in each case. Substantially gel free films, by visual inspection are produced.

|  | Reactor Size Height x Diameter, ft | $N^2$ Flow Rate | Residence Time, Hr | Water Vapor, ppm |
|---|---|---|---|---|
| Example 3 | 12 × 2 | 23 scfm | 10.4 | 300 |
| Example 4 | 12 × 2 | 23 scfm | 19.8 | 2500 |
| Example 5 | 11 × 1 | 4 scfm | 17.7 | 1800 |

As used herein, the inherent viscosity (I.V.) is measured at 25° C. using 0.50 g of polymer per 100 mL of a solvent consisting of 60% by weight phenol and 40% by weight tetrachloroethane.

Unless otherwise specified, all parts, percentages, ratios, etc., are by weight.

Obviously, numerous modifications and variations of the present invention are possible in light of the above teachings. It is therefore to be understood that within the scope of the appended claims, the invention may be practiced otherwise than as specifically described herein.

We claim:

1. A process for producing branched polyesters having improved resistance to gel formation comprising
    a) producing a precursor polyester having repeat units from at least 60 mol % terephthalic acid and at least 60 mol % ethylene glycol, and an I.V. of about 0.3 to about 1.0, b) forming the precursor polyester into particles, c) further polymerizing said particles in the solid state, and d) contacting said particles while at a temperature of about 140° to about 2° C. below the melting point of the polyester for a time of about 1 to about 100 hours with inert gas having a flow rate of greater than $2 \times 10^{-2}$ meters per second, said inert gas containing about 300 to about 7000 parts per million by volume of the vapor of water or an organic compound having at least one OH group.

2. A process according to claim 1, wherein the improvement comprises simultaneously contacting said particles with said inert gas while solid state polymerizing said particles.

3. A process according to claim 1, wherein the improvement comprises first solid state polymerizing said particles, and then contacting said particles with said inert gas.

4. A process according to claim 1 wherein said polyester particles are subjected to a temperature of about 140° to about 2° C. below the melting point of the polyester for a time of about 1 to about 100 hours to achieve an I.V. of about 0.6 to about 1.6 dl/g.

5. A process according to claim 1 wherein said inert gas is selected from nitrogen, helium, argon, hydrogen, air or mixtures thereof.

6. A process according to claim 1 wherein said inert gas contains about 500–2000 parts per million by volume of the vapor of water or an organic compound containing at least one OH group.

7. A process according to claim 1 wherein said organic compound is selected from the group consisting of water, methanol, ethanol, propanols and ethylene glycol.

8. A process according to claim 1 wherein said vapor is water vapor.

9. A process according to claim 1 wherein said pellets are subjected to a temperature of about 180° C. to about 10° C. below the melting point of the polyester.

10. A process according to claim 1 wherein said inert gas has a flow rate of at least $12 \times 10^{-2}$ m/s.

11. A process according to claim 1 wherein said precursor has an I.V. in the range of about 0.5 to about 0.8 dl/g.

12. A process according to claim 1 wherein said polyester pellets contain a catalyst residue.

13. A process according to claim 1 wherein the vapor of water or an organic compound having at least one OH group is applied as a continuous stream or in pulses.

14. A process according to claim 1 wherein said vapor is added in a plurality of locations.

* * * * *